US012533019B2

(12) United States Patent
Romashchenko et al.

(10) Patent No.: US 12,533,019 B2
(45) Date of Patent: Jan. 27, 2026

(54) TELESCOPIC OPTICAL COMPONENTS FOR EVALUATING PHOTIC EFFECTS OF INTRAOCULAR LENSES

(71) Applicant: AMO Groningen B.V., Groningen (NL)

(72) Inventors: Dmitry Romashchenko, Groningen (NL); Linda Lundström, Stockholm (SE); Peter Unsbo, Stockholm (SE); Marrie Van der Mooren, Groningen (NL)

(73) Assignee: AMO Groningen B.V., Groningen (NL)

( * ) Notice: Subject to any disclaimer, the term of this patent is extended or adjusted under 35 U.S.C. 154(b) by 453 days.

(21) Appl. No.: 18/151,340

(22) Filed: Jan. 6, 2023

(65) Prior Publication Data
US 2023/0210653 A1 Jul. 6, 2023

Related U.S. Application Data

(60) Provisional application No. 63/266,511, filed on Jan. 6, 2022.

(51) Int. Cl.
A61B 3/02 (2006.01)
A61B 3/024 (2006.01)
(Continued)

(52) U.S. Cl.
CPC ............ A61F 2/16 (2013.01); A61B 3/02 (2013.01); A61B 3/024 (2013.01); A61B 3/06 (2013.01); A61F 2/1637 (2013.01)

(58) Field of Classification Search
None
See application file for complete search history.

(56) References Cited

U.S. PATENT DOCUMENTS 5,532,770 A * 7/1996 Schneider .............. G09B 23/28
351/205
5,652,640 A 7/1997 Schneider et al.
(Continued)

FOREIGN PATENT DOCUMENTS

EP 0810427 A1 12/1997
WO 2010116019 A1 10/2010
(Continued)

OTHER PUBLICATIONS

Akondi V., et al., "Experimental Validations of a Tunable-lens-based Visual Demonstrator of Multifocal Corrections," Biomedical Optics Express, 2018, vol. 9 (12), pp. 6302-6317.
(Continued)

Primary Examiner — Darryl J Collins

(57) ABSTRACT

An apparatus uses optical components arranged as a telescope to simulate the optical effects of intraocular lenses on images viewed in the presence of scattering light and glare sources. By simulating a view of a real image through an intraocular lens and projecting the simulated view into a patient's eye, the patient can view the quality of vision that may result from use of a particular lens as a corrective tool. The intraocular lens is placed within the fields of view of peripheral optical components having prescribed operating parameters that allow for projecting a simulated image through an intraocular lens into a patient's eye before the intraocular lens is implanted. The patient can perceive the results of a corrective lens before that lens is attached to or implanted within the patient's eye.

20 Claims, 6 Drawing Sheets

(51) Int. Cl.
 *A61B 3/06* (2006.01)
 *A61F 2/16* (2006.01)

(56) References Cited

U.S. PATENT DOCUMENTS

| | | | |
|---|---|---|---|
| 9,211,061 B2* | 12/2015 | Kasthurirangan ... | A61B 3/0025 |
| 2011/0080562 A1 | 4/2011 | Iizuka et al. | |
| 2011/0149236 A1 | 6/2011 | Weeber | |
| 2013/0250245 A1 | 9/2013 | Luque et al. | |
| 2016/0296110 A1* | 10/2016 | Dorronsoro Diaz ......................... | |
| | | | G02B 27/022 |
| 2018/0271741 A1 | 9/2018 | Dorronsoro et al. | |

FOREIGN PATENT DOCUMENTS

| | | |
|---|---|---|
| WO | 2015049402 A1 | 4/2015 |
| WO | 2019002656 A2 | 1/2019 |

OTHER PUBLICATIONS

Akondi V., et al., "Temporal Multiplexing to Simulate Multifocal Intraocular Lenses: Theoretical Considerations," Biomedical Optics Express, 2017, vol. 8 (7), pp. 3410-3425.
Barcala X., et al., "Multifocal Acceptance Score to Evaluate Vision: MAS-2EV," Scientific Reports, 2021, vol. 11 (1), pp. 1397.
Barcala X. et al., "Optical Quality Evaluation for Active Afocal Systems," Optical Design and Engineering VIII, Presentation Paper, 2021, pp. 1-3.
Benedi-Garcia C., et al., "Optical and Visual Quality of Real Intraocular Lenses Physically Projected on the Patient's Eye," Biomedical Optics Express, 2021, vol. 12 (10), pp. 6360-6374.
De Gracia P., et al., "Experimental simulation of simultaneous vision," Investigative Ophthalmology & Visual Science, 2013, vol. 54 (1), pp. 415-422.
Dorronsoro C., et al., "Perceived Image Quality With Simulated Segmented Bifocal Corrections," Biomedical Optics Express, 2016, vol. 7 (11), pp. 4388-4399.
Dorronsoro C., et al., "Portable Simultaneous Vision Device to Simulate Multifocal Corrections," Optica, 2016, vol. 3 (8), pp. 918-924.
Dorronsoro C., et al., "Tunable Lenses: Dynamic Characterization and Fine-tuned Control for High-speed Applications," Optics Express, 2019, vol. 27 (3), pp. 2085-2100.
Guthoff R.F., et al., "Characterization of Starburst and Halo Size for Different Virtually Implanted Intraocular Lenses In Comparison to Subject's Quality of Vision," Investigative Ophthalmology Visual Science, 2017, vol. 58, pp. 1-3.
Lundstrom L., et al., "Compact Telescopic System for Subjective Evaluation of Intraocular Lens Designs," Investigative Ophthamalogy and Visual Science, 2022, vol. 63 (7), pp. 1802.
Marcos S., et al., "Simulating Outcomes of Cataract Surgery: Important Advances in Ophthalmology," Annual Review of Biomedical Engineering, 2021, vol. 23, pp. 277-306.
Marcos S., et al., "VioBio Lab Adaptive Optics: Technology and Applications by Women Vision Scientists," Ophthalmic Physiological Optics : the Journal of the British College of Ophthalmic Opticians (Optometrists), 2020, vol. 40 (2), pp. 75-87.
Morlock, R., et al., "Patient-Reported Spectacle Independence Questionnaire (PRSIQ): Development and Validation," American Journal of Ophthalmology, Jun. 2017, vol. 178, pp. 101-114.
Radhakrishnan A., et al., "Vision With Different Presbyopia Corrections Simulated With a Portable Binocular Visual Simulator," Plos One, 2019, vol. 14 (8), pp. 1-13.
Sawides L., et al., "Simvis Simulations of Multifocal Iol Designs Based on Public-literature Data," Optical Design and Engineering VIII, 2021, pp. 1-3.
Vinas, et al., "Visual Simulators Replicate Vision With Multifocal Lenses," Scientific Reports, 2019, vol. 9 (1), pp. 1-34.
Vinas M., et al., "Comparison of Vision Through Surface Modulated and Spatial Light Modulated Multifocal Optics," Biomedical Optics Express, 2017, vol. 8 (4), pp. 2055-2068.
Vinas M., et al., "Optical and Visual Quality With Physical and Visually Simulated Presbyopic Multifocal Contact Lenses," Translational Vision Science Technology, 2020, vol. 9 (10), pp. 1-16.
Vinas M., et al., "Pre-operative Simulation of Post-operative Multifocal Vision," Biomedical Optics Express, 2019, vol. 10 (11), pp. 5801-5817.
Vinas M., et., "Testing Vision With Angular and Radial Multifocal Designs Using Adaptive Optics," Vision Research, 2017, vol. 132, pp. 85-96.

* cited by examiner

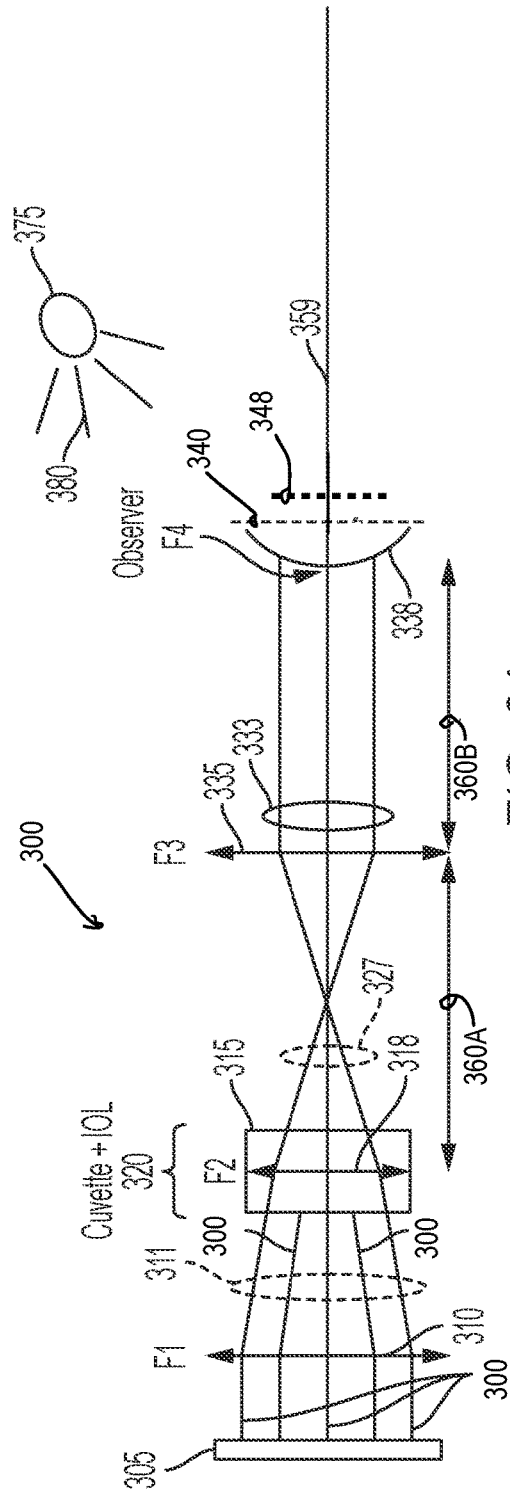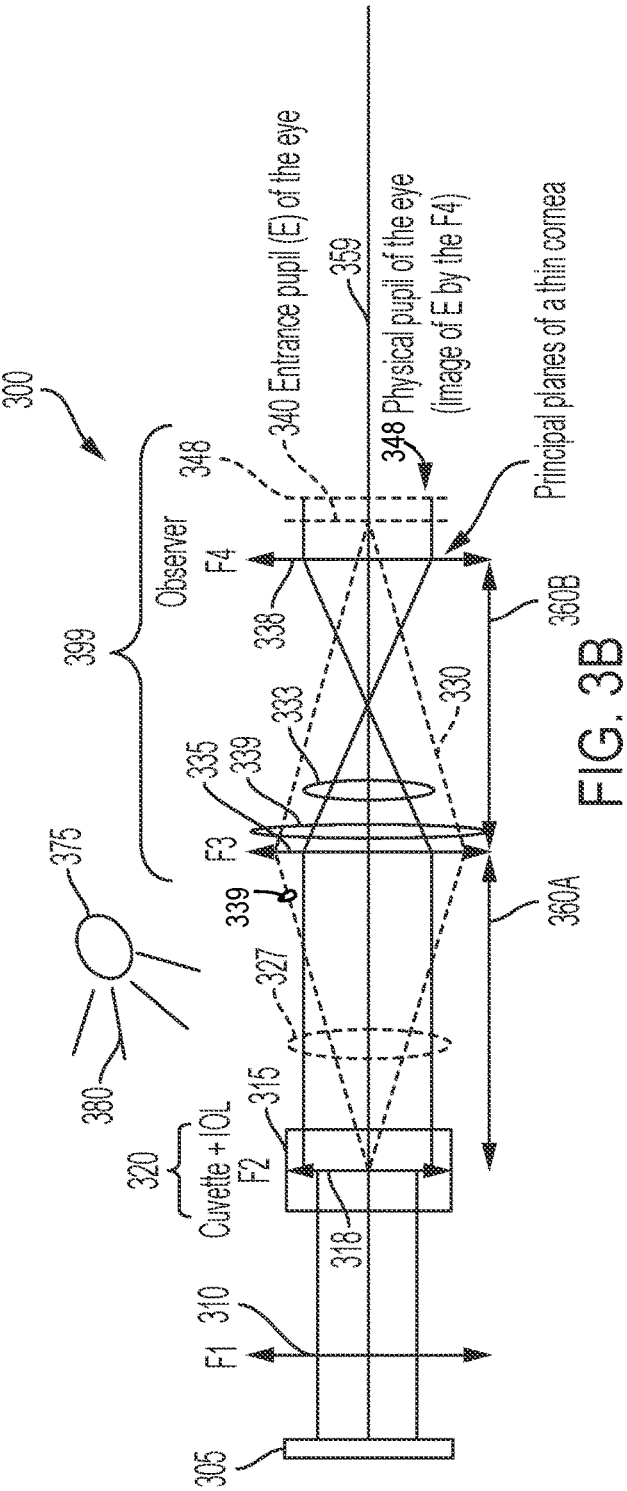

TELESCOPIC OPTICAL COMPONENTS FOR EVALUATING PHOTIC EFFECTS OF INTRAOCULAR LENSES

CROSS REFERENCE TO RELATED APPLICATIONS

This application claims priority to U.S. Provisional Patent Application Ser. No. 63/266,511 filed on Jan. 6, 2022.

FIELD OF THE DISCLOSURE

Embodiments of the present disclosure relate to apparatuses, systems and methods of evaluating photic effects of intraocular lenses (IOLs) including, for example, phakic IOLs, pseudophakic IOLs, and piggyback IOLs (i.e. IOLs implanted in an eye already having an IOL).

BACKGROUND

Intraocular lenses are now used to treat a wide variety of eye conditions, such as but not limited to presbyopia, myopia, and cataracts. For example, and without limiting this disclosure, presbyopia is a condition that affects the accommodation properties of the eye. As objects move closer to a young, properly functioning eye, the effects of ciliary muscle contraction and zonular relaxation allow the lens of the eye to change shape, and thus increase its optical power and ability to focus at near distances. This accommodation can allow the eye to focus and refocus between near and far objects. As these accommodations are less effective with age, injury or eye disease, the eye benefits from medical intervention, including corrective lenses.

Along with reductions in accommodation of the eye, age and other factors may also induce clouding of the lens due to the formation of a cataract. A cataract may form in the hard central nucleus of the lens, in the softer peripheral cortical portion of the lens, or at the back of the lens. Cataracts can be treated by the replacement of the cloudy natural lens with an artificial lens. An artificial lens replaces the natural lens in the eye, with the artificial lens often being referred to as an intraocular lens or "IOL."

Other conditions are treated with monofocal IOLs that are intended to provide vision correction at one distance only, usually the far focus. At the very least, since a monofocal IOL provides vision treatment at only one distance and since the typical correction is for far distance, spectacles are usually needed for good vision at near distances and sometimes for good vision at intermediate distances. The term "near vision" generally corresponds to vision provided when objects are at a distance from the subject eye at equal; or less than 1.5 feet. The term "distant vision" generally corresponds to vision provided when objects are at a distance of at least about 5-6 feet or greater. The term "intermediate vision" corresponds to vision provided when objects are at a distance between near vision and distant vision, per their respective definitions. Without limiting this disclosure to specific definitions, such characterizations of near, intermediate, and far vision generally correspond to those addressed in Morlock R, Wirth R J, Tally S R, Garufis C, Heichel C WD, Patient-Reported Spectacle Independence Questionnaire (PRSIQ): Development and Validation. Am J Ophthalmology 2017; 178:101-114.

There have been various attempts to address limitations associated with monofocal IOLs. For example, multifocal IOLs have been proposed that deliver, in principle, at least two or more foci, e.g., at both far vision and near vision distances, far vision and intermediate vision, or far, near and some degree of intermediate focus. Such multifocal IOLs are intended to provide good vision at multiple distances, and include both refractive and diffractive multifocal IOLs. In one non-limiting example, a multifocal IOL intended to correct vision at two distances may provide a near (add) power of about 3.0 or 4.0 diopters.

Multifocal IOLs may, for example, rely on a diffractive optical surface to direct portions of the light energy toward differing focal distances, thereby allowing the patient to see both near and far objects clearly. Multifocal ophthalmic lenses (including contact lenses or the like) have also been proposed for treatment of presbyopia without removal of the natural crystalline lens. Diffractive optical surfaces, either monofocal or multifocal, may also be configured to provide reduced chromatic aberration.

Diffractive monofocal and multifocal lenses can make use of a material having a given refractive index and a surface curvature which provide a refractive power. Diffractive lenses have a diffractive profile which confers the lens with a diffractive power that contributes to the overall optical power of the lens. The diffractive profile is typically characterized by a number of diffractive zones. The diffractive zones within a lens may be arranged in any effective configuration for the use at hand. One non-limiting example configuration includes arranging the diffractive zones as annular lens zones, or echelettes, spaced about the optical axis of the lens. Each echelette may be defined by an optical zone, a transition zone between the optical zone and an optical zone of an adjacent echelette, and an echelette geometry. The echelette geometry includes an inner and outer diameter and a shape or slope of the optical zone, a height or step height, and a shape of the transition zone. The surface area or diameter of the echelettes largely determines the diffractive power(s) of the lens and the step height of the transition between echelettes largely determines the light distribution between the different powers. Together, these echelettes form a diffractive profile. The use of the term echelette is not limiting of this disclosure but is used for exemplary purposes only.

Although multifocal ophthalmic lenses lead to improved quality of vision for many patients, there are still issues to be considered before implanting them into a patient's eye. For example, some pseudophakic patients experience undesirable visual effects (dysphotopsia), e.g., glare or halos. Halos may arise when light from the unused focal image creates an out-of-focus image that is superimposed on the used focal image. For example, if light from a distant point source is imaged onto the retina by the distant focus of a bifocal IOL, the near focus of the IOL will simultaneously superimpose a defocused image on top of the image formed by the distant focus. This defocused image may manifest itself in the form of a ring of light surrounding the in-focus image, and is referred to as a halo. Another area of improvement revolves around limits of the typical bifocality of multifocal lenses. While multifocal ophthalmic lenses typically provide adequate near and far vision, intermediate vision may be compromised.

Although certain proposed treatments may provide some benefit to patients in need thereof, further advances would be desirable. For example, it would be desirable to provide improved IOL systems and methods that confer enhanced image quality across a wide and extended range of foci without dysphotopsia. Further, improved IOL systems and methods to reduce visual symptoms produced by transition zones of diffractive profiles such as halo, glare, and scatter, may be desired.

In light of the above discussion, a need currently exists in the art of IOLs for ways to assess how a person (or even any other animal) will perceive the photic effects of an IOL after placement in the person's eye. Physicians and patients would benefit by using tools that simulate the effects of the IOL before in vivo placement. In particular, the current technology around IOLs is deficient in ways to allow a patient to visualize how an intraocular lens will affect overall vision, such as but not limited to color, clarity, and contrast of a viewed object, before ever physically receiving the IOL through surgery or other medical procedures. This kind of pre-implantation evaluation is also necessary to predict the effects of scattering light and glares that will be noticeable by the patient after IOL placement under certain lighting conditions.

BRIEF SUMMARY

In a first embodiment, an apparatus simulates optical effects of an intraocular lens (IOL) and includes a first optical component having a first optical power and configured for receiving light from a target object. A second optical component includes the intraocular lens and receives incident light from the first optical component onto the intraocular lens, wherein the second optical component forms scattering light at a second optical power. A third optical component is positioned adjacent the second optical component and transmits the scattering light and an image of the second optical component toward a receiving optical component.

In another embodiment, an angular magnification (M) between the second optical component and the receiving optical component has a magnitude that is equal to 1.

In another embodiment, an angular magnification (M) between the second optical component and the receiving optical component has a magnitude that is approximately equal to 1.

In another embodiment, an angular magnification (M) between the second optical component and the receiving optical component has a magnitude that is between 0.9 and 1.1.

In another embodiment, the third optical component defines a back focal distance on an optical axis between the second optical component and the third optical component; the receiving optical component defines a front focal distance on the optical axis between the third optical element and the receiving optical component; and the dimension of the back focal distance of the third optical component is based on the front focal distance of the receiving optical component to achieve an angular magnification that is approximately equal to 1.

In another embodiment, the first optical component is a camera objective comprising a spherical aberration that matches an average of spherical aberrations of corneas of a plurality of human eyes.

In another embodiment, the second optical component includes a lens holder having a cuvette holding the intraocular lens in a saline solution.

In another embodiment, the receiving optical component is a cornea of a human eye, and wherein the third optical power is approximately equal to a cornea optical power.

In another embodiment, the third optical power and the cornea optical power are approximately 40 diopters.

In another embodiment, the second optical component further includes a lens holder having a cuvette holding the intraocular lens in a saline solution, and the effective optical power of the first optical component, the intraocular lens, the lens holder and the saline solution is approximately equal to a third optical power of the third optical component.

In another embodiment, a numerical aperture (NA) of the third optical component captures and transmits at least +/−5 degrees of scattering light from the second optical component.

In another embodiment the first optical component, the second optical component, and the third optical component incorporate multiple lenses in respective combinations.

In another embodiment, a system simulates optical effects of an intraocular lens (IOL) implanted proximately to a cornea of an eye having a physical pupil. The system includes a first optical component receiving light from a target object. A second optical component incorporates the intraocular lens within a lens holder and a liquid solution in a position to receive incident light from the first optical component at a first power. A telescope assembly includes a third optical component and a fourth optical component, wherein the third optical component is configured for positioning proximately to the eye to allow the cornea to operate as the fourth optical component, wherein the third optical component is in a position to receive scattering light from the second optical component and an image of the second optical component and transmit the scattering light and the image at a third optical power to the fourth optical component. The angular magnification (M) of the scattering light has a magnitude that is approximately equal to 1 at the physical pupil of the eye.

In another embodiment, the third optical component defines a back focal distance on an optical axis between the second optical component and the third optical component; the fourth optical component is the cornea that defines a front focal distance on the optical axis between the third optical component and the cornea; and the dimension of the back focal distance of the third optical component corresponds to the front focal distance of the cornea to achieve the angular magnification that is approximately equal to 1.

In another embodiment, the lateral magnification between the second optical component and a plane comprising the physical pupil is approximately 1.

In another embodiment, the system includes a glare source directing additional light onto the target object.

In another embodiment, the glare source adds a veiling illuminance of a respective size into the physical pupil of the eye.

In another embodiment, the glare source further includes rings of light projected onto the target object, wherein the rings of light correspond to the respective size of the veiling illuminance.

In another embodiment, the rings of light have an inner ring and an outer ring, wherein the inner ring has a brighter intensity than the outer ring.

In another embodiment, the first optical component incorporates a camera objective comprising a spherical aberration having dimensions that match an average of corresponding spherical aberrations in corneas of a plurality of human eyes.

In another embodiment, a first refractive index between the second optical component and the third optical component is approximately equal to a second refractive index of an aqueous chamber of the eye.

In another embodiment, the third optical power is approximately equal to the cornea optical power.

In another embodiment, the third optical power and the cornea optical power are approximately 40 diopters.

In another embodiment, the effective optical power of the first optical component, the intraocular lens, the lens holder and the solution is approximately equal to the third optical power of the third optical component and the cornea optical power.

In another embodiment, a numerical aperture (NA) of the third optical component captures and transmits at least +/−5 degrees of scattered light from the second optical component.

In another embodiment, the first optical component, the second optical component, and the third optical component include respective combinations of multiple lenses.

In another embodiment, a method simulates optical effects of an intraocular lens (IOL) receiving light from a target object. The method includes transmits the light through a first optical component at a first optical power to a second optical component, wherein the second optical component includes a lens holder and the intraocular lens. The method further includes transmitting scattering light from the second optical component, at a second optical power, to a third optical component, wherein the third optical component includes a third optical power. Positioning the third optical component between the second optical component and a receiving optical component, scattering light transmits from the second optical component through the third optical component. The method incorporates transmitting the scattering light and an image of the third optical component through the receiving optical component at an angular magnification and lateral magnification with respective magnitudes approximately equal to 1.

In another embodiment, a cornea of a human eye is the receiving optical component.

In another embodiment, the method includes defining a back focal distance for the third optical component on an optical axis between the second optical component and the third optical component; defining a front focal distance of the receiving optical component on the optical axis between the third optical component and the receiving optical component; and selecting the dimension of the back focal distance of the third optical component according to the front focal distance of the receiving optical component to achieve the angular magnification that is approximately equal to 1.

In another embodiment, additional light from a glare source is projected onto the target object in the field of view of the first optical component and induces a veiling illuminance of a respective size onto the receiving optical component with the scattering light from the target object and the second optical component.

In another embodiment, the method uses the glare source to project rings of light onto the target object, wherein the rings of light correspond to the respective size of the veiling illuminance.

In another embodiment, the rings of light from the glare source include an inner ring and an outer ring, wherein the inner ring has a brighter intensity than the outer ring.

In another embodiment, intraocular lens is replaced with either of a mono-focal intraocular lens and a multi-focal intraocular lens.

In another embodiment, the method includes directing the additional light from the glare source onto the target object, wherein the target object comprises a black background or a pre-determined scene image.

BRIEF DESCRIPTION OF THE DRAWINGS

FIG. 3A illustrates a respective schematic view of a test assembly for simulating a view of a target object onto an imaging component, including but not limited to a human eye, for an intraocular lens (IOL) positioned within optical components establishing a telescope effect according to the disclosure herein.

FIG. 3B illustrates a respective schematic view of a test assembly for simulating a view of a target object onto an imaging component, including but not limited to a human eye, for an intraocular lens (IOL) positioned within optical components establishing a telescope effect according to the disclosure herein.

DETAILED DESCRIPTION

Figure 1A:
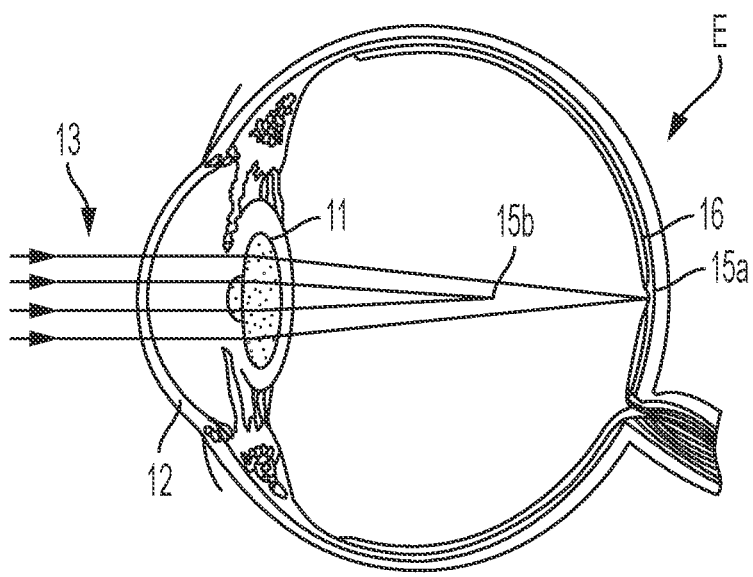
FIG. 1A illustrates a cross-sectional view of an eye with an implanted multifocal refractive intraocular lens.

This disclosure considers multiple kinds of ophthalmic lenses used to correct vision and presents options to simulate the optical effects of respective lenses so that a patient can view, prior to final lens selection, the vision that may result from use of a particular lens as a corrective tool. By arranging specified optical components in select relationships with a given lens, such as but not limited to an IOL, the apparatus, system, and methods of this disclosure can project an image into a patient's pupil, and that image will simulate the same optical effects that the respective lens will present if actually attached or implanted into the patient's eye.

In one non-limiting embodiment, the optical components are arranged to effectively define a telescope effect by which the optics of a particular IOL under consideration are projected into the patient's eye for evaluation from a respective telescope lens arrangement, based in part on the power of the IOL. This disclosure, furthermore, presents lens testing equipment and procedures that simultaneously simulate scattering light that arises from a lens, and any additional light originating from sources of light in the environment of the target object as viewed by the patient. In some embodiments, the optical components described herein have physical dimensions and operating parameters that characterize how the optical components work, individually and collectively. In some situations, this disclosure describes relationships between the optical components in terms of position or in terms of operating parameters being comparable to each other. These descriptions are not limiting of the disclosure but are presented for example purposes only. In fact, when this disclosure uses phrases such as features being "approximately equal," the phrase "approximately equal" should be given its broadest plain meaning in the context of the technology. In some embodiments magnitudes of certain optical parameters may be approximately equal if the magnitudes differ from each other by an amount that is within a range selected from 0-5 percent of the larger power value, 5-10 percent of the larger power value, 10-15 percent of the larger power value, 15-20 percent of the larger power value, and 20-25 percent of the larger power value. In other contexts, different ranges may apply.

In addition to the background discussion above, this disclosure incorporates certain contextual information regarding example structures for IOLs, the optical effects of these structures on patient vision, and the environment in which IOLs are successfully used. As would be expected, numerous diagnostic steps occur before a physician prescribes an IOL for a patient. Measurements of a patient's eye may be made in a clinical setting, such as by an optometrist, ophthalmologist, or other medical or optical professional. The measurements may be made via manifest refraction, autorefraction, tomography, or a combination of these methods or other measurement methods. The optical aberrations of the patient's eye may also be determined.

A determination of the visual range of the patient may also be determined. For example, the ability of the patient to focus on near objects (presbyopia) may be measured and determined. A range of add power for the ophthalmic lens may be determined.

The measurements of the patient's eye may be placed in an ophthalmic lens prescription, which includes features of at least one optic that is intended to address the optical aberrations of the patient's eye, as well as features that address the visual range for the patient (e.g., an amount of add power and number of focuses to be provided by the optic).

The ophthalmic lens prescription may be utilized to fabricate an optic for the ophthalmic lens. A refractive profile of the optic may be determined based on the ophthalmic lens prescription, to correct for the optical aberrations of the patient's eye. Such a refractive profile may be applied to the optic, whether on a surface including the diffractive profile or on an opposite optical surface. The diffractive profile may also be determined to provide for the desired distribution of add power for the optic.

The determination of one or more of a refractive or diffractive profile and the fabrication of the optic may be performed remotely from the optometrist, ophthalmologist, or other medical or optical professional that performed the measurements of a patient's eye, or may be performed in the same clinical facility of such an individual. If performed remotely, the fabricated optic may be delivered to an optometrist, ophthalmologist, or other medical or optical professional, for being provided to a patient. For an intraocular lens, the fabricated optic may be provided for implant into a patient's eye.

The fabricated optic may be a custom optic fabricated specifically for the patient's eye, or may be fabricated in a manufacturing assembly and then selected by an optometrist, ophthalmologist, or other medical or optical professional for supply to a patient, which may include implantation in the patient's eye.

This disclosure considers multiple kinds of ophthalmic lenses used to correct vision and presents options to simulate the optical effects of respective lenses so that a patient can view, prior to final lens selection, the vision that may result from use of a particular lens as a corrective tool. This disclosure presents apparatuses, systems, and methods by which a patient and their physician can evaluate the effectiveness of certain lenses for a given patient before the patient decides on a particular treatment. By placing test lenses within the fields of view of peripheral optical components, this disclosure illustrates how a patient can perceive the results of a corrective lens before that lens is attached to or implanted within the patient's eye.

The numerous arrangements of optical components disclosed herein allow for testing all kinds of corrective lenses, including but not limited to mono-focal and multi-focal lenses. For example, and without limiting this disclosure to any single embodiment, FIGS. 1A, 1B, 2A, and 2B, illustrate multifocal IOL lens geometries, aspects of which are described in U.S. Patent Publication No. 2011-0149236 A1, which is hereby incorporated by reference in its entirety. These figures are for example purposes only to provide context to the discussions that follow. Similar images could show respective physical structures for mono-focal lenses as well, but are not necessary in an example configuration used for discussion.

FIG. 1A is a cross-sectional view of an eye E fit with a multifocal IOL 11. As shown, multifocal IOL 11 may, for example, comprise a bifocal IOL. Multifocal IOL 11 receives light from at least a portion of cornea 12 at the front of eye E and is generally centered about the optical axis of eye E. For ease of reference and clarity, FIGS. 1A and 1B do not disclose the refractive properties of other parts of the eye, such as the corneal surfaces. Only the refractive and/or diffractive properties of the multifocal IOL 11 are illustrated.

Each major face of lens 11, including the anterior (front) surface and posterior (back) surface, generally has a refractive profile, e.g., biconvex, plano-convex, plano-concave, meniscus, etc. The two surfaces together, in relation to the properties of the surrounding aqueous humor, cornea, and other optical components of the overall optical system, define the effects of the lens 11 on the imaging performance by eye E. Conventional, monofocal IOLs have a refractive power based on the refractive index of the material from which the lens is made, and also on the curvature or shape of the front and rear surfaces or faces of the lens. One or more support components may be configured to secure the lens 11 to a patient's eye.

Multifocal lenses may optionally also make special use of the refractive properties of the lens. Such lenses generally include different powers in different regions of the lens so as to mitigate the effects of presbyopia. For example, as shown in FIG. 1A, a perimeter region of refractive multifocal lens 11 may have a power which is suitable for viewing at far viewing distances. The same refractive multifocal lens 11 may also include an inner region having a higher surface curvature and a generally higher overall power (sometimes referred to as a positive add power) suitable for viewing at near distances.

Figure 1B:
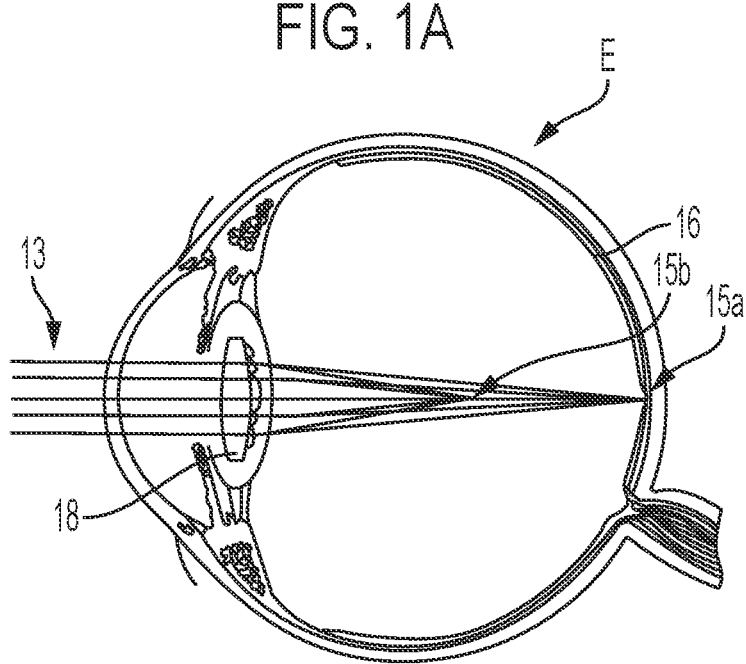
FIG. 1B illustrates a cross-sectional view of an eye having an implanted multifocal diffractive intraocular lens.

Rather than relying entirely on the refractive properties of the lens, multifocal diffractive IOLs or contact lenses can also have a diffractive power, as illustrated by the IOL 18 shown in FIG. 1B. The diffractive power can, for example, comprise positive or negative power, and that diffractive power may be a significant (or even the primary) contributor to the overall optical power of the lens. The diffractive power is conferred by a plurality of concentric diffractive zones which form a diffractive profile. The diffractive profile may either be imposed on the anterior face or posterior face or both.

The diffractive profile of a diffractive multifocal lens directs incoming light into a number of diffraction orders. As light 13 enters from the front of the eye, the multifocal lens 18 directs light 13 to form a far field focus 15a on retina 16 for viewing distant objects and a near field focus 15b for viewing objects close to the eye. Depending on the distance from the source of light 13, the focus on retina 16 may be the near field focus 15*b* instead. Typically, far field focus 15*a* is associated with $0^{th}$ diffractive order and near field focus 15*b* is associated with the $1^{st}$ diffractive order, although other orders may be used as well.

Bifocal ophthalmic lens 18 typically distributes the majority of light energy into two viewing orders, often with the goal of splitting imaging light energy about evenly (50%: 50%), one viewing order corresponding to far vision and one viewing order corresponding to near vision, although typically, some fraction goes to non-viewing orders.

Corrective optics may be provided by phakic IOLs, which can be used to treat patients while leaving the natural lens in place. Phakic IOLs may be angle supported, iris supported, or sulcus supported. The phakic IOL can be placed over the natural crystalline lens or piggy-backed over another IOL. It is also envisioned that the present disclosure may be applied to inlays, onlays, accommodating IOLs, pseudophakic IOLs, other forms of intraocular implants, spectacles, and even laser vision correction.

Figure 2A:
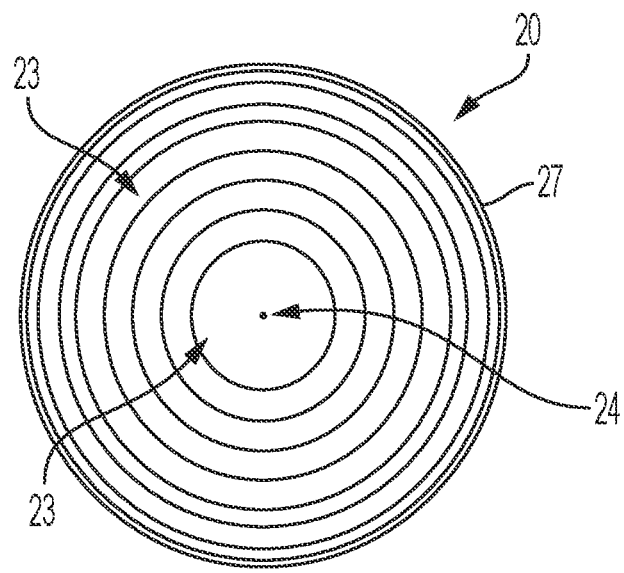
FIG. 2A illustrates a front view of a diffractive multifocal intraocular lens.
Figure 2B:
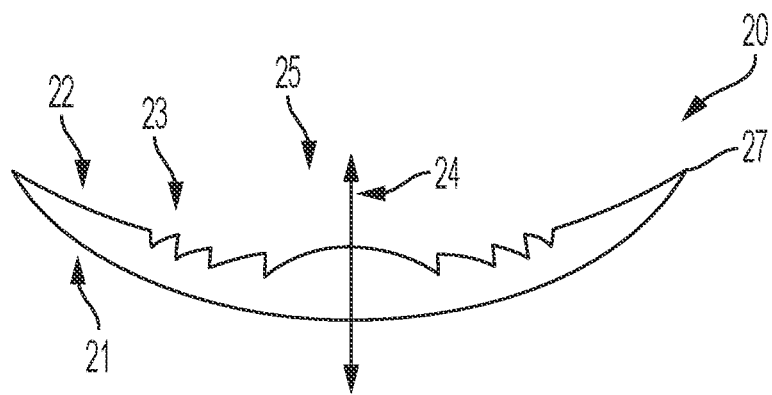
FIG. 2B illustrates a cross-sectional view of a diffractive multifocal intraocular lens.

FIGS. 2A and 2B show aspects of a conventional diffractive multifocal lens 20. Multifocal lens 20 may have certain optical properties that are generally similar to those of multifocal IOLs 11, 18 described above. Multifocal lens 20 has an anterior lens face 21 and a posterior lens face 22 disposed about an optical axis 24. The faces 21, 22, or optical surfaces, extend radially outward from the optical axis 24 to an outer periphery 27 of the optic. The optical axis 24 may pass through a central zone 25 of the optic. The faces 21, 22, or optical surfaces, face opposite each other.

When fitted onto the eye of a subject or patient, the optical axis of lens 20 is generally aligned with the optical axis of eye E. The curvature of lens 20 gives lens 20 an anterior refractive profile and a posterior refractive profile. Although a diffractive profile may also be imposed on either anterior face 21 and posterior face 22 or both, FIG. 2B shows posterior face 22 with a diffractive profile. The diffractive profile is characterized by a plurality of annular diffractive zones or echelettes 23 spaced about optical axis 24. While analytical optics theory generally assumes an infinite number of echelettes, a standard multifocal diffractive IOL typically has at least 9 echelettes, and may have over 30 echelettes. For the sake of clarity, FIG. 2B shows only 4 echelettes. Typically, an IOL is biconvex, or possibly plano-convex, or convex-concave, although an IOL could be plano-plano, or other refractive surface combinations. As noted below, the use of echelettes for the diffractive zones is purely optional, and this disclosure encompasses other constructions as well.

Regardless of the exact structure of a particular lens, such as an IOL, a patient and their physician would benefit from tools enabling pre-evaluation of a lens on a patient's vision before final selection and implantation or attachment. This disclosure, therefore, presents FIG. 3A and FIG. 3B as example implementations by which an IOL 318 could be evaluated prior to use. The optical components F1 (310), F2 (320), F3 (335), and F4 (338) of the embodiments of this disclosure are configured to provide a patient with a view of a target object 305 that may be present at the patient's physical pupil 348 if a particular IOL 318 has been implanted into the patient's eye. In one embodiment, an apparatus 300 for simulating optical effects of an intraocular lens (IOL) 318 at an imaging component includes a first optical component 310 having a first optical power and receiving light 300 from a target object 305. The light 300 originates from the environment as necessary to replicate a view of the target object 305 on an imaging component, such as but not limited to the physical pupil 348 defined in a human eye. In typical embodiments, the imaging component may be a patient's eye, such as but not limited to a human eye, or more particularly the physical pupil 342 of the eye. This disclosure, however, includes veterinarian uses and even artificial vision with computer sensors used as an imaging component as well and is not necessarily limited to a human eye. For example, a computerized imaging component may be configured to display exactly the same image that would result at a patient's eye after an IOL has been implanted.

In some diagnostic settings, an imaging component may be an image sensor connected to a computer or network equipment as shown in FIG. 7 because computer vision systems can also be used for evaluation of IOL optics. In many scenarios, however, the technologies discussed herein are particularly adept to allow a live patient to experience the photic effects of an IOL 318 with their own eyes in real time testing simply by positioning their eye near an eyepiece, such as the third optical component 335 of a test apparatus 300 disclosed herein. In the embodiment of FIGS. 3A and 3B, a second optical component 320 includes a combination of an intraocular lens (IOL 318) within a lens holder 315. In non-limiting embodiments, the lens holder 315 contains a liquid solution such as a saline solution in which the IOL 318 sits. The second optical component 320 receives incident light 311 from the first optical component 310 onto the intraocular lens 318, and the second optical component 320 transmits both scattering light 327 from the environment of the target object 305 and imaging light 330 corresponding to a view of the target object 305, as shown in FIG. 3B. The second optical component 320 has an output light transmission, therefore, of scattering light 327 at a second optical power. A third optical component 335 may be positioned between the second optical component 320 and an imaging component, including but not limited to a physical pupil 348 of a human eye, wherein the third optical component 335 includes a third optical power. It is important to note that the second optical power of FIGS. 3A and 3B may be calculated by considering the first optical power of the first optical component 310 and the combined optical power of the IOL 318 within the lens holder 315. In this regard, the second optical power of FIGS. 3A and 3B is an output optical power of output light transmission of scattering light 327 that originated from the first optical component 310 and was transmitted through the lens holder 315, a water solution in the lens holder, and the IOL 318 therein.

In one example embodiment generally illustrated in FIGS. 3A and 3B, the third optical component 335 transmits an image 330 of the second optical component 320 and further transmits the scattering light 333 from the second optical component 320 to a physical pupil 348 of the patient's eye at an angular magnification (M) having a magnitude that is approximately equal to 1. In this regard, the overall apparatus 300 may be described as a first telescope in which the first optical component 310 and the second optical component 320 operate together (F1+F2) as an objective of the first telescope. The third optical component 335 can then be considered an eyepiece of the first telescope viewing the target object 305. The first telescope of this non-limiting example images the target object 305 to the entrance pupil 340 of the eye.

In order to simultaneously transmit the image from the IOL 318 to the patient's eye, the third optical component 335 defines a back focal distance and a front focal distance. In one non-limiting embodiment, the third optical component 335 defines a back focal distance on an optical axis 359 relative to the second optical component, and the cornea of the eye defines a front focal distance on the optical axis relative to third optical component. The dimension of the back focal distance of the third optical component is based on the front focal distance of the cornea to achieve the angular magnification that is approximately equal to 1. In one embodiment, the third optical component defines a back focal distance 360A on the optical axis 359 between the second optical component 320 and the third optical component 335. In non-limiting examples, the fourth optical component may be the cornea 338, as shown in FIGS. 3A and 3B. In any embodiment, the fourth optical component may be considered the receiving optical component (e.g., a cornea of a human eye, another final mechanical lens of a series, or a computer imaging device, as described above). In general, the receiving optical component may be considered a last component receiving the final image of the target object 305 as manipulated by the IOL 318. The fourth optical component (F4), such as the cornea 338, defines a front focal distance 360B on the optical axis 359 between the third optical component 335 and the cornea 338. The dimension of the back focal distance 360A of the third optical component 335 corresponds to the front focal distance 360B of the fourth optical element (i.e., the receiving optical component that may be a cornea 338).

Additionally, as shown in FIGS. 3A and 3B this disclosure includes the lateral magnification between the second optical component 320 and the physical pupil 348 to have a one-to-one relationship, or approximately as close to 1:1 as possible. In one non-limiting example, the entrance pupil 340 of the eye includes the image of the physical pupil 348 through the cornea 338. In other words, the physical pupil may be considered as the object for the cornea 338, projecting an image called the entrance pupil from that persective. It is located about 3 mm behind the cornea and is about 13% larger than the physical pupil. (Bennett and Rabbett's Clinical Visual Optics, Chapter 2 "The eye's optical system", p. 13). Therefore, in one embodiment, a non-limiting aspect of this disclosure allows for F3 at the third optical component 335 to image the F2 plane at the second optical component 320 onto the entrance pupil 340 of the eye. The distance between F3 335 and F4 (e.g., the cornea 338) is fixed and known (for an average 40 D cornea power of F4):

$$d\_(F3-F4) = f'_{\_F3} + f_{\_F4} = 25+25 = 50 \text{ mm}$$

This used the condition that $f'_{\_F3}$ must equal to $f_{\_F4}$, and $f_{\_F4}$ [m]=n_air/Power$_{\_F4}$=1/(40 D). From paraxial imaging, the second optical component 320 labeled F2 must be at a distance of ~47.32 mm from the lens F3. In these conditions, the total lateral magnification from plane F2 of the second optical component 320 to the physical pupil 348 of the eye is −1. The condition for the angular magnification being −1 is satisfied by $f'_{\_F3}$=25 mm and $f_{\_F4}$=25 mm. Thus, the system presents angular and lateral magnification equal to −1 (i.e., a magnitude of 1) between the F2 plane at the second optical component 320 and the plane of the physical pupil 348.

The set-up of FIGS. 3A and 3B may utilize a camera objective as the first optical component 310, and in non-limiting embodiments, the camera objective may be engineered with a spherical aberration that matches an average cornea of a human eye. In this way, the testing assembly can optimally simulate a view that a patient would see if the IOL 318 in the lens holder 315 were actually implanted into the patient's eye. The lens holder 315 also emulates an in vivo environment for the lens (IOL 318); for example, the lens holder 315 may be a cuvette holding the intraocular lens 318 in water or another appropriate water solution, such as saline having a refractive index that matches, as closely as possible, the fluidic aqueous humor of an eye. It is also envisioned that other solutions may be utilized so long as they share the same properties as the media in which the lens is to be used or analyzed.

As noted, embodiments of this disclosure may tailor the first optical power, the second optical power, and the third optical power to provide a view through a fourth optical component, also referred to as a receiving optical component, such as the cornea of a patient's eye, that realistically simulates a corrected view that the patient would experience if the IOL 318 were positioned on or within the patient's eye. In one embodiment, the third optical component 335 defines a back focal distance $f'_{\_F3}$ 360A on an optical axis 359 relative to the second optical component 320, and the cornea (F4) of the eye defines a front focal distance $f_{\_F4}$ 360B on the optical axis 359 relative to the entrance pupil 340 of the eye. The dimension of the back focal distance $f'_{\_F3}$ of the third optical component 335 is based on the front focal distance $f_{\_F4}$ of the cornea (F4) to achieve the angular magnification that is approximately equal to 1 or −1 (i.e., a magnitude of 1, regardless of whether a resulting image is flipped). The term "approximately equal" includes at least angular magnification values that are within ten percent of a magnitude of 1, i.e., between 0.9 and 1.1, inclusive.

Whatever optical power is chosen for a given scenario, the optical power must account for (i) the output power of output light transmission of scattering light 327 from the second optical component 320 (including the IOL 318 and optionally the lens holder 315 and a water or saline solution) and (ii) the output power of the overall light transmission 339 from the third optical component 335. In some embodiments these effective optical powers from the second optical component 320 and the third optical component 335 are approximately equal.

In some aspects, this disclosure presents a simulation tool in the form of a testing apparatus 300 and system that transmits respective portions of a light spectrum reflected from a target object 305, directs the reflected light 300 through an arrangement of optical components 310, 320, 335, 338 and provides a simulated view of the target object 305 on an imaging component, or receiving optical component, such as the entrance pupil (E) 340 of a patient's eye, or even onto a computerized image sensor. The simulated view allows the patient or the computer to evaluate the photic effects of the IOL 318 on a patient's view of the target object 305. Embodiments of this disclosure ensure that the simulated view includes light 300 from the environment of the target object 305, imaging light by which the IOL 318 transmits a real image of the target object 305 to the physical pupil 348 of the patient's eye, and any additional light from glare sources 375 proximate the target object 305 or the imaging component 340. Incorporating the scattering light 327 and the additional light 380 from glare sources provides a more realistic simulation of an actual image that would be viewed through a particular use of a respective IOL 318. In some embodiments, the numerical aperture (NA) of the third optical component 335 is large enough to capture and transmit a selected range of all light sources. In the non-limiting example of FIGS. 3A and 3B, the third optical component 335 transmits at least +/−5 degrees of scattered light received from the environment of the target object 305.

From an optics perspective, the embodiment of FIGS. 3A and 3B may be described as a telescope assembly of two optical components (i.e. the above described first telescope made of the first, second and third optical components 310, 320, 335 and a second telescope made of the third optical component 335 and a fourth optical component such as the patient's cornea 338 or any receiving optical component described above). In the disclosed embodiments, a telescope effect is useful to project a simulated view through an IOL 318 onto a patient's eye. In this embodiment, this disclosure incorporates a system for simulating optical effects of an intraocular lens (IOL 318) onto an imaging component (i.e., either a patient's eye or an imaging sensor connected to a computer).

The system again includes a first optical component 310 receiving light 300 from a target object 305. The first optical component 310 may be a camera objective that transmits the light and, optionally, additional light 380 from glare sources, to a telescope assembly 399 as illustrated in FIG. 3B. The telescope assembly of this example is formed by at least one arrangement of the third optical component (F3, 335) and a fourth optical component (F4, including the patient's cornea 348). In this regard, a telescope assembly 399 utilizes the third optical component 335 and the cornea 348 (or another receiving optical component) to provide a planned optical effect and project an image of the target object 305 and all light sources into the physical pupil 348 of the patient's eye. The second optical component 320 includes the intraocular lens (IOL 318) within a lens holder 315 in a position to receive incident light 311 from the first optical component 310 at a first power. The third optical component 335 is in a position to receive at least scattering light 327 and an image 339 of the second optical component from the second optical component 320 at a second optical power. The scattering light 327 and the image 339 of the second optical component 320 transmits at a third optical power. The third optical component 335 transmits the scattering light 333 and the image 339 from the second optical component 320 to the receiving optical component, such as a patient's cornea 338 at an angular magnification (M) having a magnitude that is equal to or approximately equal to 1 or −1.

The system of this disclosure may utilize a glare source 375 directing additional light 380 onto the target object 305 to test the effects of the glare source 375 on a simulated image that is viewable by a patient's eye or an image sensor connected to a computer. In some embodiments, the glare source 375 adds a veiling illuminance of a respective size onto the imaging component 340. In certain testing scenarios, the glare source 375 may include rings of light projected onto the target object, wherein the rings of light correspond to the respective size of the veiling illuminance that was detectable from the simulated view of the target object. The rings of light may include an inner ring and an outer ring, wherein the inner ring has a brighter intensity than the outer ring. It is also envisioned that there can be more than 2 rings.

Similar to the testing apparatus 300 described above, the system embodiment may include the first optical 310 component having a camera objective formed with a spherical aberration that matches an average cornea of a human eye. For more realistic in vivo conditions, the lens holder 315 may be a cuvette holding the intraocular lens 318 in water or another solution such as saline. As noted, embodiments of this disclosure may tailor the first optical power, the second optical power, and the third optical power to provide a view on an imaging component, such as the patient's eye, that realistically simulates a corrected view that the patient would experience if the IOL were actually positioned in the patient's eye. In one example of the system embodiment, the third optical power of the third optical component 335 is approximately 40 diopters (D), which matches the optical power of an average human cornea, which in the above noted embodiments may be another optical component (F4) to be considered.

This disclosure presents a simulation system that transmits respective portions of a light spectrum reflected from a target object 305, directs the reflected light through an arrangement of optical components 310, 320, 335, and a receiving optical component and provides a simulated view on an imaging component, which may be either a computerized image sensor or a patient's eye. The simulated view allows the patient or the computer to evaluate the photic effects of the IOL 318 on a patient's view of the target object 305 in various lighting and environmental conditions.

Another embodiment of FIGS. 3A and 3B includes a method of simulating optical effects of an intraocular lens (IOL) 318 onto an imaging component or receiving optical component such as a patient's cornea 338. In another embodiment, a method of simulating optical effects of an intraocular lens (IOL) 318 implanted proximately to a cornea 338 of an eye having a physical pupil 348 includes the steps of transmitting light 330 from a first optical component 310 at a first optical power to a second optical component 320, wherein the second optical component 320 includes a lens holder 315 and the intraocular lens 318 in a water or saline solution. The method further includes transmitting scattering light 327 induced from the second optical component 320, at a second optical power, to a third optical component 335, wherein the third optical component has a third optical power. By positioning the third optical component 335 between the second optical component 320 and a fourth optical component, including but not limited to a patient's cornea 338, the method includes establishing an entrance pupil of a telescope assembly 399 relative to the eye. The entrance pupil of this second telescope assembly 399 is located at a point on the optical axis 359 where the entrance pupil 340 of a patient's eye is imaged by the third optical component 335. This second telescope assembly 399 has an exit pupil at the physical pupil 348 of the eye (after F4 338), and its intermediate image of the physical pupil 348 is the entrance pupil 340 of the eye. In one embodiment the telescope assembly includes at least the third optical component 335 and the cornea 338 as the fourth optical component. The method includes transmitting the light 330 through the first optical element 310 and transmitting the scattering light 327 from the second optical component 320, through the third optical component 335 and into the physical pupil 348 of the eye at an angular magnification and lateral magnification with respective magnitudes approximately equal to 1 (i.e., magnifications of 1 or −1).

As shown in the examples that follow, the method may include directing additional light 380 from a glare source 375 onto a target object 305 in the field of view of the first optical component 310 and inducing a veiling illuminance of a respective size onto the imaging component with the scattering light and the imaging light. The glare source 375 may project rings of light onto the target object, wherein the rings of light correspond to the respective size of the veiling illuminance. In some embodiments, the rings of light may include an inner ring and an outer ring, wherein the inner ring has a brighter intensity than the outer ring. It is also contemplated that more than two rings may be used.

Optional testing components for simulating a view through an IOL may include replacing the intraocular lens (IOL 318) with either of a mono-focal intraocular lens or a multi-focal intraocular lens. Some test protocols of the following examples illustrate that the first optical component 310, the second optical component 320, and the third optical component 335 of this disclosure are only example configurations and additional components may be utilized to improve performance. For example, any of the first, second, and third optical components may have multiple components or lenses within their respective structures. Similarly, other tests may include directing the additional light 380 from the glare source 375 onto the targe object from different positions. The target object may include a real life scene, a virtual black background, other colors for a physical or virtual background, or a pre-determined scene image that will be replicated and simulated for viewing and evaluating.

As noted above, it is desirable for the lateral and angular magnification between the second optical component (F2, 320) and physical pupil 348 of the eye to be 1 or −1 (the light may be reversed when going through the first telescope and/or the second telescope described above). The plane of the second optical element F2 320 includes an IOL 318, immersed in a cuvette 315 with saline solution. The refractive index of the solution is the same or close to that of the aqueous chamber of the eye (1.333). Thus, the angles of the light scattering when the light leaves the cuvette gain additional magnification according to the Snell's law: $n_{cuvette} \cdot \sin(\alpha_{cuvette}) = n_{air} \cdot \sin(\alpha_{air}) = \sin(\alpha_{air})$, where n is refractive index, and α is the angle for the scattered light. For small angles, sine can be replaced by angles in radians. For a 5° angle, the residual error is only 1e−4 (Matlab R2021a). In some non-limiting embodiments the third optical component 335 and the fourth optical component, including but not limited to a cornea 338, (i.e., [F3+F4]) form a telescope, and back focal length of lens $$F3(f'_{F3})$$

equals to the front focal length of the cornea F4 ($f_{F4}$).

If the refractive index of the media behind F4 would have been 1, the result would be a telescope with 1:1 magnification. But refractive index behind F4 (cornea) is approximately 1.333. This means that the back focal length of F4 is 1.333 times longer than the front focal length of F4, and the following equation ensues:

$$\text{Power}_{F4}[D] = \frac{n}{f_{F4}} = \frac{n'}{f'_{F4}},$$

where n and n' are refractive indices before and after F4, f and f' are front and back focal lengths, and Power is the optical power of F4 in diopters. Effectively, the longer focal length means that angles for all rays are reduced by a factor of 1.333. This reduction by 1.333 is completely cancelled out by the magnification due to the saline solution, described earlier.

Another embodiment, can also achieve the same result by making the third optical component (F3, 335) operate under the same conditions as the cornea (F4, 338). That is, have n=1.333 to the left of F3 and have n=1 to the right of F3. The angular magnification between the second optical component (F2, 320) and the physical pupil 348 plane will be −1 if:

$$f'_{F3} = f_{F4} = 25 \text{ mm},$$

and the distance between F3 and F4 equal to $$f'_{F3} + f_{F4} = 50 \text{ mm}$$

one non-limiting example. The lateral magnification between F2 and the physical pupil plane will be −1 if additionally:

$$f_{F3}[m] = f'_{F4}[m] = \frac{1.333}{40 \, D}.$$

These embodiments are only for example purposes and do not limit the scope of this disclosure.

FIG. 7 illustrates an embodiment of a system 1100 that may be utilized to perform all or a portion of the methods disclosed herein. The system 1100 may include a processor 1102, an input 1104, and a memory 1106. In certain embodiments the system 1100 may include a manufacturing assembly 1108.

The processor 1102 may comprise a central processing unit (CPU) or other form of processor. In certain embodiments the processor 1102 may comprise one or more processors. The processor 1102 may include one or more processors that are distributed in certain embodiments, for example, the processor 1102 may be positioned remote from other components of the system 1100 or may be utilized in a cloud computing environment. The memory 1106 may comprise a memory that is readable by the processor 1102. The memory 1106 may store instructions, or features of intraocular lenses, or other parameters that may be utilized by the processor 1102 to perform the methods disclosed herein. The memory 1106 may comprise a hard disk, read-only memory (ROM), random access memory (RAM) or other form of non-transient medium for storing data. The input 1104 may comprise a port, terminal, physical input device, or other form of input. The port or terminal may comprise a physical port or terminal or an electronic port or terminal. The port may comprise a wired or wireless communication device in certain embodiments. The physical input device may comprise a keyboard, touchscreen, keypad, pointer device, or other form of physical input device. The input 1104 may be configured to provide an input to the processor 1102.

The ophthalmic lenses disclosed herein in the form of intraocular lenses are not limited to lenses for placement in the individual's capsular bag. For example, the intraocular lenses may comprise those positioned within the anterior chamber of the eye. In certain embodiments the intraocular lenses may comprise "piggy back" lenses or other forms of supplemental intraocular lenses.

Examples utilizing the technology discussed above are considered additional disclosure and are set forth below.

Example 1

Evaluation of the subjective visual experience through intraocular lenses (IOL) prior to implantation is important both for patient satisfaction and for optimizing the optical design of the IOL. This work designed a compact see-through IOL telescope (Type 2, IOL-T2) that can transfer the scattering as well as other optical properties of the IOL correctly into the pupil plane of the eye.

The objective of the IOL-T2 consists of a +45 D camera objective and the +20 D IOL in a water cuvette that together have an effective power of +40 D. The intermediate image can then be viewed by a +40 D eyepiece, thus generating a telescope with angular magnification of −1. The eyepiece also serves the purpose to, together with the cornea of the observer, image the IOL into the pupil plane with both the angular and the transverse magnification equal to −1. As a proof of concept, the IOL-T2 was used to evaluate the foveal contrast sensitivity (CS) with and without a glare source for one monofocal and two multifocal IOLs in three subjects. The glare source was located in the 2.5° nasal visual field of the right eye and gave 1 lux at the level of the IOL telescope. The average luminance of the screen was 50 cd/m2.

The grating resolution CS at 7.5 cycles/degree was reduced with the multifocal IOLs compared to the monofocal design. No statistically significant difference was found between the +2.75 D and the +4.00 D addition. The glare source induced additional decrease in CS, but the reduction varied between individuals, being on average 0.1 log CS for the monofocal design and 0.05 log CS for the multifocal designs.

The new IOL-T2 has a compact design and transfer all optical properties of the IOL correctly into the pupil plane of the eye. It is thereby a useful tool to compare the subjective (and the objective, see separate abstract) experience through different IOL designs prior to implantation as well as to develop new IOL designs.

Methodology and Results

The subject was sitting in a head-chin rest and used the right eye for the measurements (the left eye was covered with an eyepatch). An artificial pupil was mounted in the system to give an effective pupil diameter of 4 mm in the plane of the IOL (the aperture was mounted on the front side of the IOL holder, about 5 mm in front of the IOL). The screen was 220 cm from the IOL telescope.

Initially, a binary high contrast sector star was shown on the screen and the subject was asked to adjust the position of the eyepiece to get as sharp image as possible with the mono-focal (ZCB00) IOL in place (starting with the eyepiece too close to the eye). Once the defocus level was set, the whole IOL telescope was positioned to give the largest possible field of view with the pupil of the eye in the conjugated plane to the IOL (i.e. moving in z-direction, starting from too close to the eye and stopping just before the field of view started to become smaller). This gave a field of view with an approximate diameter of 23°. These settings were kept for all measurements of the subject.

Contrast sensitivity at 7.5 cpd was evaluated with a Bayesian 2-alternative forced choice algorithm. The stimuli were sinusoidal Gabor gratings ($\sigma$=1.6°) oriented along the 450 or 135° meridian presented on the calibrated 10-bit grayscale CRT monitor. The mean luminance of the screen was 50 cd/$m^2$. The subject was instructed to look straight at the screen (no additional fixation target was used).

The glare source was diode (~4 mm in diameter) mounted just in front of the screen 9.6 cm away from its centre to the right (which will appear as left to the subject because the image is turned upside-down in the telescope) and gave an illuminance of ~1 lux at the first surface of the IOL telescope.

Figure 4:
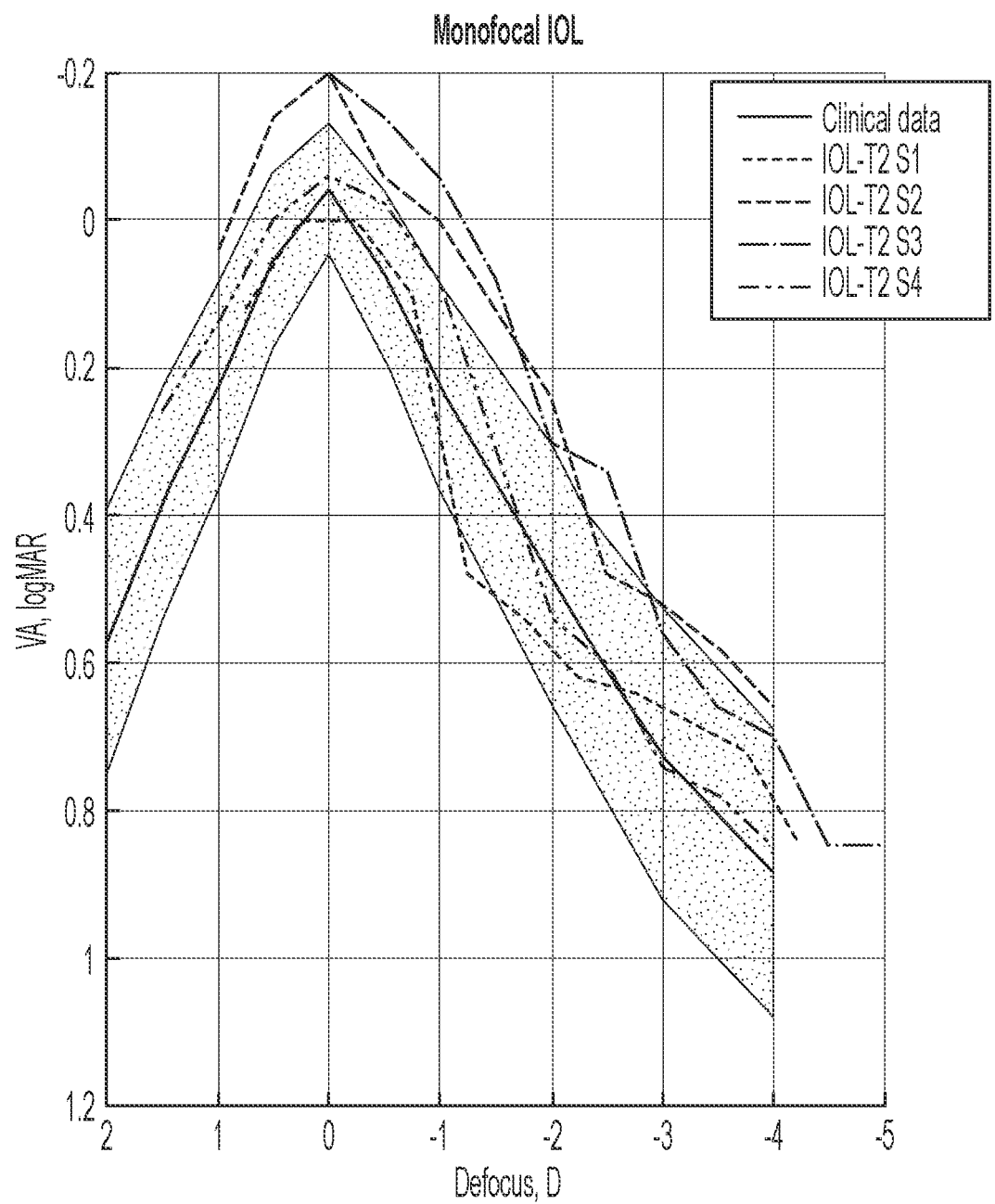
FIG. 4 is a graphical representation of results of testing a group of subjects with a monofocal intraocular lens having +20 diopter power and measuring the foveal through-focus visual acuity from +1 D to −4 D of defocus in 0.5 D steps.
Figure 5:
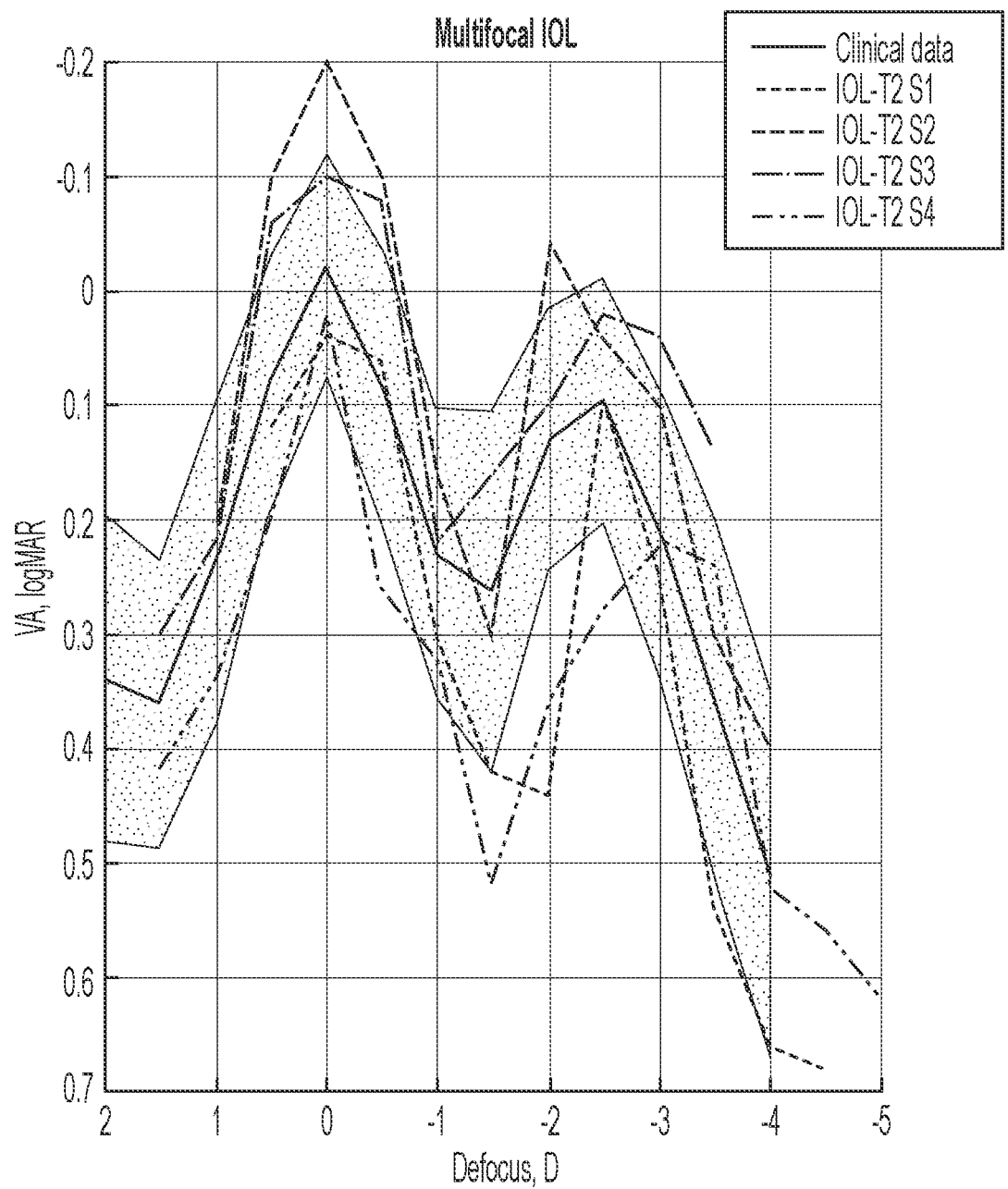
FIG. 5 is a graphical representation of results of testing a group of subjects with a multifocal intraocular lens having +20 diopter power and measuring the foveal through-focus visual acuity from +1 D to −4 D of defocus in 0.5 D steps.
Figure 6:
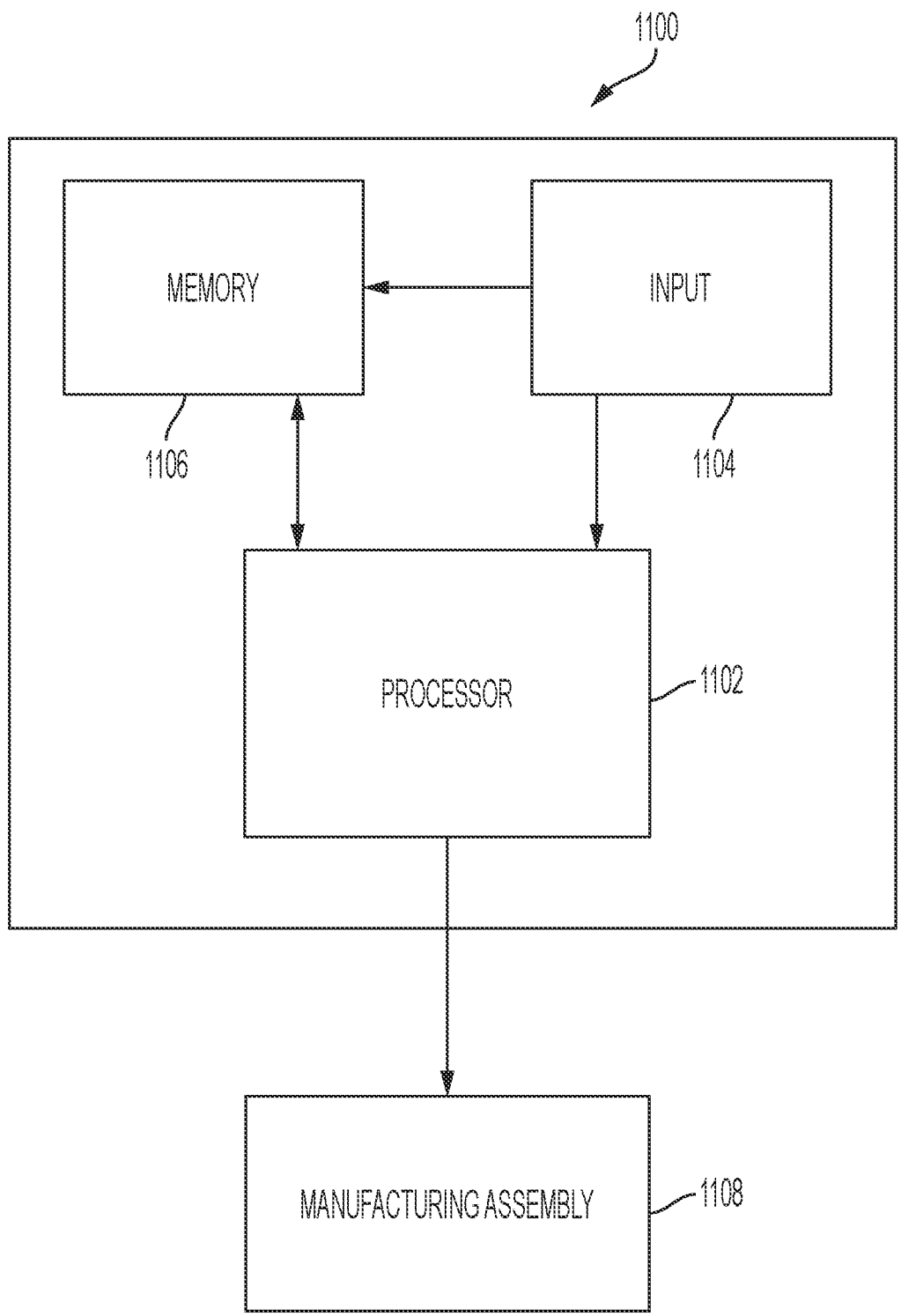
FIG. 6 is a schematic illustration of a computer and network environment in which the embodiments of this disclosure may optionally use for evaluation purposes according to embodiments of this disclosure.

When comparing the measured CS through the IOL-T2 with the mono-focal IOL to the habitual unrestricted vision, some subjects showed lower CS. This is probably due to the fact that the tested IOL is designed to compensate for the large positive spherical aberration of the cornea. To provide an even more realistic estimate, the camera objective should be replaced by a system with spherical aberration similar to the cornea). The results for three subjects are illustrated in FIGS. 4-6.

Example 2

Positive dyshotopsia (PD) (such as halo, glare, starburst) is one of the main drawbacks of intraocular lenses (IOLs) for presbyopia correction. Adequate assessment of these effects before lens implantation is a valuable tool for both analysis and improvement of currently available IOL designs. This task is non-trivial and can be done by means of different optical setups. In this work we evaluate and compare two see-through setups, designed for simulations of the physical IOL-related visual symptoms.

Methods

Two IOL telescopes, Type 1 (IOL-T1) and Type 2 (IOL-T2) have been objectively compared in their ability to translate visual symptoms from an IOL to an observer. In these systems, an IOL is part of the main ray path, which allows to study PD induced by an actual manufactured IOL.

Each setup was evaluated with three different IOL designs: one monofocal, and two multi-focals with 2.75 D and 4.00 D add power respectively. All three IOLs had the same base power. A camera was used in place of an observer, and a central glare source was imaged against a black background. The analysis was performed on high dynamic range images obtained from combining several frames (RGB converted to monochrome) with different exposure times.

Light scatter data from literature is used as basis for comparison of the level and the field location of the halo of multifocal IOLs.

Results

In both setups, the recorded radial-average scatter function allows to clearly identify the multifocality-related halos, and distinguish between the higher- and lower-add IOLs. The scatter levels of monofocal and multifocal IOLs were comparable with earlier reported data (Langeslag, et al. JCRS 2014). The location of the IOL-related PD peaks is similar between the two devices and resides below 0.4 degrees in field angle. This is comparable with previously reported theoretical prediction of 0.33 degrees for a 4.00 D add power multifocal IOL (Van der Mooren et al IOVS2016).

CONCLUSIONS

This study compares objectively the PD measured with two see-through setups designed to evaluate actual IOLs. The results show that IOL-T1 and IOL-T2 perform similarly and show data comparable to published pre-clinical data for different IOL designs, allowing objective assessment of PD. Subjective testing with these devices is out of the scope of this work and is reported in two separate studies.

Example 3

Purpose

The purpose of this study was to introduce and validate a new system and methodology to evaluate photic phenomena (halos, glare and starbursts) induced by different intraocular lens (IOL) technologies using a "see-through" IOL analyzer system in phakic subjects.

Methods

The IOL Design Analyzer (IDA) is a system that allows subjects to look through the optics of an IOL. It consists of an eye model into which an IOL is loaded and then attached to a system of relay optics that allows a subject to "look through" the IOL and view a scene including any photic phenomena that may be induced by the IOL.

Twenty subjects participated in this study. These looked through the IDA system under different conditions. Five different IOL designs with different clinical levels of photic phenomena were evaluated by the subjects.

Subjects were asked to perform the following tests: First, a subjective rating of the level of bother-some-ness perceived in a natural scene with a central glare source. After, a ring test where the size of a ring was adjusted to match the size of the veiling luminance perceived by the subject around the glare source. Two brightness levels were used for the rings, one brighter ring (Inner ring) and one dimmer ring (Outer ring).

The results of this study were compared to the clinical outcomes of the subjective perception of halo, glare and starbursts of cataract patients implanted with the same IOL models.

Results

The outer ring test provided results that were well correlated with the clinical questionnaire levels of halo ($R2=0.97$), glare ($R2=0.99$) and starbursts ($R2=0.81$) bothersome-ness. The inner ring test showed much lower correlation with the clinical levels ($R2<0.48$). Correlations between subjective grading and clinical responses were strongly dependent on the luminance level of the glare source and the photic phenomena evaluated, being $R2=0.72$ in the best of cases.

Conclusion

The results of this study show that the disclosed embodiments can be used to simulate photic phenomena induced by different IOL technologies in phakic eyes. Certain quantitative methods showed a high correlation with the subjective perception of photic phenomena found in cataract patients implanted with the same IOL models.

However, exact conditions under which the tests are performed (glare source brightness, scene selection/brightness, subject expectations/variability) can have large effects on test results. The exact visual experience of an implanted subject may not directly map onto the subjective impression in this and similar "see-through" systems.

Example 4

Estimation of the subjective visual experience through intraocular lenses (IOL) prior to implantation is important both for patient satisfaction and for optimizing the optical design of the IOL. Without limiting this disclosure, this work developed a see-through IOL telescope (IOL-T2) to measure the through-focus visual acuity with different IOL designs.

The new IOL-T2 has a compact design and transfers the optical properties of the IOL correctly into the pupil plane of the eye (Lundström, Romashchenko, van der Mooren, Unsbo, Börjeson, Canovas, *ARVO Invest. Ophthalmol. Vis. Sci.* 2022; 63(7):1802-F0418). FIGS. 4 and 5 show the results of four subjects (26 to 44 years of age) who viewed a letter chart through the IOL-T2 with two different IOL designs of +20 D in optical power: one monofocal (FIG. 4) and one multifocal (FIG. 5) with an addition corresponding to +2.5 D in the spectacle plan. Trial lenses were placed in front of the telescope to measure the foveal through-focus visual acuity from +1 D to −4 D of defocus in 0.5 D steps. The testing was performed monocularly with 1% cyclopentolate to paralyze accommodation and an artificial aperture corresponding to 4.5 mm in entrance pupil diameter. The log MAR letter chart was placed at 3 m and the data was recalculated to compensate for the distance.

The through-focus visual acuity in log MAR of the subjects with the two IOL designs is shown in the figure (IOL-T2 S1, S2, S3, and S4) in orange, yellow, purple, and green. In blue is the corresponding clinical through-focus data on an older population implanted with the same two IOL models. The solid blue lines show the average visual acuity and the shaded blue regions the ±1 standard deviation for 130 and 72 subjects with the monofocal and multifocal IOL, respectively. The average visual acuity for distance with the IOL-T2 was −0.12 and −0.08 log MAR with the monofocal and the multifocal IOL, respectively, compared to −0.04 and −0.02 log MAR in the clinical data. At −2.5 D defocus with the multifocal IOL the IOL-T2 gave 0.11 log MAR, compared to 0.10 log MAR in the clinical data.

The see-through IOL telescope IOL-T2 generates through-focus visual acuity data comparable to clinical measurements on patients with implanted IOLs. It is thereby a useful tool to compare the subjective experience through different IOL designs prior to implantation as well as to develop new IOL designs.

Features of embodiments may be modified, substituted, excluded, or combined as desired.

In addition, the methods herein are not limited to the methods specifically described, and may include methods of utilizing the systems and apparatuses disclosed herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, components, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed component essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An apparatus for simulating optical effects of an intraocular lens (IOL), the apparatus comprising:
    a first optical component comprising a first optical power and configured for receiving light from a target object;
    a second optical component comprising an intraocular lens and receiving incident light from the first optical component onto the intraocular lens, wherein the second optical component forms scattering light at a second optical power; and
    a third optical component positioned adjacent the second optical component and transmitting the scattering light and an image of the second optical component toward a receiving optical component.

2. An apparatus according to claim 1, further comprising an angular magnification (M) between the second optical component and the receiving optical component having a magnitude that is approximately equal to 1.

3. The apparatus of claim 1, wherein:
    the third optical component defines a back focal distance on an optical axis between the second optical component and the third optical component;
    the receiving optical component defines a front focal distance on the optical axis between the third optical element and the receiving optical component; and
    the dimension of the back focal distance of the third optical component is based on the front focal distance of the receiving optical component to achieve an angular magnification that is approximately equal to 1 or −1.

4. The apparatus of claim 1, wherein the first optical component comprises a camera objective comprising a spherical aberration that matches an average of spherical aberrations of corneas of a plurality of human eyes.

5. The apparatus of claim 1, wherein the second optical component comprises a lens holder comprising a cuvette holding the intraocular lens in a saline solution.

6. The apparatus of claim 1, wherein the receiving optical component is cornea of a human eye, and wherein the third optical power is approximately equal to a cornea optical power.

7. The apparatus of claim 1, wherein the second optical component further comprises a lens holder comprising a cuvette holding the intraocular lens in a saline solution, and the effective optical power of the first optical component, the intraocular lens, the lens holder and the saline solution is approximately equal to a third optical power of the third optical component.

8. A system for simulating optical effects of an intraocular lens (IOL) implanted proximately to a cornea of an eye having a physical pupil, the system comprising:
    a first optical component receiving light from a target object;
    a second optical component comprising the intraocular lens within a lens holder and a liquid solution in a position to receive incident light from the first optical component at a first power, a telescope assembly comprising a third optical component and a fourth optical component, wherein the third optical component is configured for positioning proximately to the eye to allow the cornea to operate as the fourth optical component, wherein: the third optical component is in a position to receive scattering light from the second optical component and an image of the second optical component and transmit the scattering light and the image at a third optical power to the fourth optical component; and
    the angular magnification (M) of the scattering light has a magnitude that is approximately equal to 1 at the physical pupil of the eye.

9. The system of claim 8, wherein:
    the third optical component defines a back focal distance on an optical axis between the second optical component and the third optical component;
    the fourth optical component is the cornea that defines a front focal distance on the optical axis between the third optical component and the cornea; and
    the dimension of the back focal distance of the third optical component corresponds to the front focal distance of the cornea to achieve the angular magnification having a magnitude that is approximately equal to 1.

10. The system of claim 9, wherein the lateral magnification between the second optical component and a plane comprising the physical pupil is approximately 1.

11. The system of claim 8, further comprising a glare source directing additional light onto the target object.

12. The system of claim 8, wherein the first optical component comprises a camera objective comprising a spherical aberration having dimensions that match an average of corresponding spherical aberrations in corneas of a plurality of human eyes.

13. The system of claim 8, wherein a first refractive index between the second optical component and the third optical component is approximately equal to a second refractive index of an aqueous chamber of the eye.

14. The system of claim 13, wherein the third optical power is approximately equal to the cornea optical power.

15. The system of claim 14, wherein the third optical power and the cornea optical power are approximately 40 diopters.

16. The system of claim 8, wherein an effective optical power of the first optical component, the intraocular lens, the lens holder and the solution is approximately equal to the third optical power of the third optical component and the cornea optical power.

17. The system of claim 8, wherein a numerical aperture (NA) of the third optical component captures and transmits at least +/−5 degrees of scattered light from the second optical component.

18. The system of claim 8, wherein the first optical component, the second optical component, and the third optical component comprise respective combinations of multiple lenses.

19. A method of simulating optical effects of an intraocular lens (IOL) receiving light from a target object, the method comprising:
transmitting the light through a first optical component at a first optical power to a second optical component, wherein the second optical component comprises a lens holder and the intraocular lens;
transmitting scattering light from the second optical component, at a second optical power, to a third optical component, wherein the third optical component comprises a third optical power; positioning the third optical component between the second optical component and a receiving optical component;
transmitting the scattering light from the second optical component through the third optical component;
transmitting the scattering light and an image of the third optical component through the receiving optical component at an angular magnification and lateral magnification with respective magnitudes approximately equal to 1.

20. The method of claim 19, further comprising using a cornea of a human eye as the receiving optical component.

* * * * *